(12) United States Patent
Chen

(10) Patent No.: US 7,855,773 B2
(45) Date of Patent: Dec. 21, 2010

(54) LIQUID CRYSTAL PANEL HAVING LOW-RESISTANCE COMMON ELECTRODE LAYER

(75) Inventor: Hung-Yu Chen, Miao-Li (TW)

(73) Assignee: Chimel Innolux Corporation, Miao-Li County (TW)

( * ) Notice: Subject to any disclaimer, the term of this patent is extended or adjusted under 35 U.S.C. 154(b) by 154 days.

(21) Appl. No.: 12/154,758

(22) Filed: May 27, 2008

(65) Prior Publication Data

US 2008/0291376 A1  Nov. 27, 2008

(30) Foreign Application Priority Data

May 25, 2007  (CN) .................. 2007 1 0074609

(51) Int. Cl.
*G02F 1/1339*  (2006.01)
(52) U.S. Cl. .................. 349/153; 349/55; 349/56; 349/108
(58) Field of Classification Search ......... 349/106–108, 349/110, 155–156
See application file for complete search history.

(56) References Cited

U.S. PATENT DOCUMENTS 5,488,498 A * 1/1996 Fujii et al. .................. 349/149

| 6,392,735 | B1 * | 5/2002 | Tani .......................... 349/156 |
| 6,731,369 | B2 | 5/2004 | Choo |
| 7,671,956 | B2 * | 3/2010 | Jeoung et al. ................ 349/149 |
| 2006/0274233 | A1 * | 12/2006 | Takizawa ..................... 349/108 |
| 2008/0084525 | A1 * | 4/2008 | Yamada ....................... 349/110 |

FOREIGN PATENT DOCUMENTS

CN  1731239 A  2/2006

* cited by examiner

*Primary Examiner*—David Nelms
*Assistant Examiner*—Phu Vu
(74) *Attorney, Agent, or Firm*—Wei Te Chung

(57) ABSTRACT

An exemplary liquid crystal panel (20) includes a first substrate (22), a second substrate (24) facing toward the first substrate (22), a liquid crystal layer (23) sandwiched between the two substrates, and a plurality of the conductive adhesive blocks (225) in the non-displaying region. The first substrate includes a non-displaying region (222). A transparent conductive layer (226) is disposed at a surface of the first substrate and capable of transmitting a common voltage signal to the liquid crystal layer. The first substrate at the non-displaying region includes protrusions (253) defining a plurality of gaps (254) therebetween. The transparent conductive layer covers the protrusions including parts of the protrusions defining the gaps. The conductive adhesive blocks contact the transparent conductive layer at the non-displaying region.

8 Claims, 5 Drawing Sheets

LIQUID CRYSTAL PANEL HAVING LOW-RESISTANCE COMMON ELECTRODE LAYER

CROSS-REFERENCE TO RELATED APPLICATION

This application is related to, and claims the benefit of, a foreign priority application filed in China as Serial No. 200710074609.3 on May 25, 2007. The related application is incorporated herein by reference.

FIELD OF THE INVENTION

The present invention relates to liquid crystal panels, and particularly to a liquid crystal panel having a low-resistance common electrode layer.

GENERAL BACKGROUND

A conventional liquid crystal display (LCD) has the advantages of portability, low power consumption, and low radiation. LCDs have been widely used in various portable information products, such as notebooks, personal digital assistants (PDAs), video cameras and the like. The LCD generally includes a liquid crystal panel for displaying images, and a backlight module for illuminating the liquid crystal panel.

Referring to FIG. 5 and FIG. 6, a conventional liquid crystal panel 10 includes a first substrate assembly 11, a second substrate assembly 13 facing toward the first substrate assembly 11, a liquid crystal layer 12 sandwiched between the two substrate assemblies 11, 13, a sealant frame 14, and four conductive adhesive blocks 15.

The sealant frame 14 has a four-sided frame shape. The sealant frame 14 is applied at a periphery of the second substrate assembly 13, and is sandwiched between the two substrate assemblies 11, 13. The first substrate assembly 11, the second substrate assembly 13 and the sealant frame 14 cooperatively define a displaying region 110 for accommodating the liquid crystal layer 12. A non-displaying region 112 defined by the sealant frame 14 and periphery regions of the two substrate assemblies 11, 13 surrounds the displaying region 110. The four conductive adhesive blocks 15 are located at four corner portions of the non-displaying region 112 of the liquid crystal panel 10.

The first substrate assembly 11 includes a first transparent substrate 113, and a color filter layer 115 located on a surface of the first transparent substrate 113 at the displaying region 110. The color filter layer 115 includes a plurality of red, green, blue (RGB) color filter units 116, a plurality of black matrix units 117, and a coating layer 119. The black matrix units 117 fill up gaps between the RGB color filter units 116. One black matrix unit 117 adjacent to the sealant frame 14 extends to the non-displaying region 112 to cover the first transparent substrate 113, thereby forming a light shielding layer 150. The light shielding layer 150 is configured to absorb light beams at the non-displaying region 112. The coating layer 119 covers the RGB color filter units 116 and the black matrix units 117, and forms a planar surface. The first substrate assembly 11 further includes a common electrode layer 120 covering the coating layer 119 and the light shielding layer 150.

The second substrate assembly 13 includes a second transparent substrate 133, and a thin film transistor (TFT) driving circuit 131 arranged on the second transparent substrate 133.

Referring also to FIG. 7, this shows one part of the TFT driving circuit 131. The TFT driving circuit 131 includes a plurality of scanning lines 132 that are parallel to each other and that each extend along a first direction, a plurality of data lines 134 that are parallel to each other and that each extend along a second direction orthogonal to the first direction, a plurality TFTs 135 that function as switching elements, a plurality of pixel electrodes 136, and a plurality of common electrodes 137. Each of the TFTs 135 is provided in the vicinity of a respective point of intersection of the scanning lines 132 and the data lines 134, and includes a gate electrode 1351, a source electrode 1352 and a drain electrode 1353. The gate electrode 1351, the source electrode 1352 and the drain electrode 1353 are connected to a corresponding scanning line 132, a corresponding data line 134 and a corresponding pixel electrode 136, respectively. Ends of the common electrodes 137 are connected together to form a common bus (not shown), and the common bus extends to the non-displaying region 112. The common bus is electrically connected to the common electrode layer 120 via the four conductive adhesive blocks 15. A common voltage signal generated by a driving circuit (not shown) is simultaneously transmitted to the common electrodes 137 and the common electrode layer 120. The pixel electrodes 136, the common electrode layer 120 and the liquid crystal layer 12 sandwiched therebetween cooperatively form a plurality of liquid crystal capacitors Clc.

The common electrode layer 120 has an essential resistance, and a resistance-capacitance (RC) circuit formed by the liquid crystal capacitor Clc and the essential resistance may affect the common voltage signal. In this situation, a waveform of the common voltage signal may be distorted, and accordingly horizontal crosstalk may occur. This can lead to impairment of images displayed on the liquid crystal panel 10.

What is needed, therefore, is a liquid crystal panel that can overcome the above-described deficiencies.

SUMMARY

In one preferred embodiment, a liquid crystal panel includes a first substrate defining a non-displaying region, a second substrate facing toward the first substrate, a liquid crystal layer sandwiched between the two substrates, a plurality of the conductive adhesive blocks in the non-displaying region, and a transparent conductive layer provided at a surface of the first substrate and capable of transmitting a common voltage signal to the liquid crystal layer. The first substrate at the non-displaying region includes a plurality of protrusions defining a plurality of gaps therebetween. The transparent conductive layer covers the protrusions including parts of the protrusions defining the gaps. The conductive adhesive blocks contact the transparent conductive layer.

Other novel features and advantages will become more apparent from the following detailed description when taken in conjunction with the accompanying drawings. In the drawings, all the views are schematic.

DETAILED DESCRIPTION OF PREFERRED EMBODIMENTS

Figure 1:
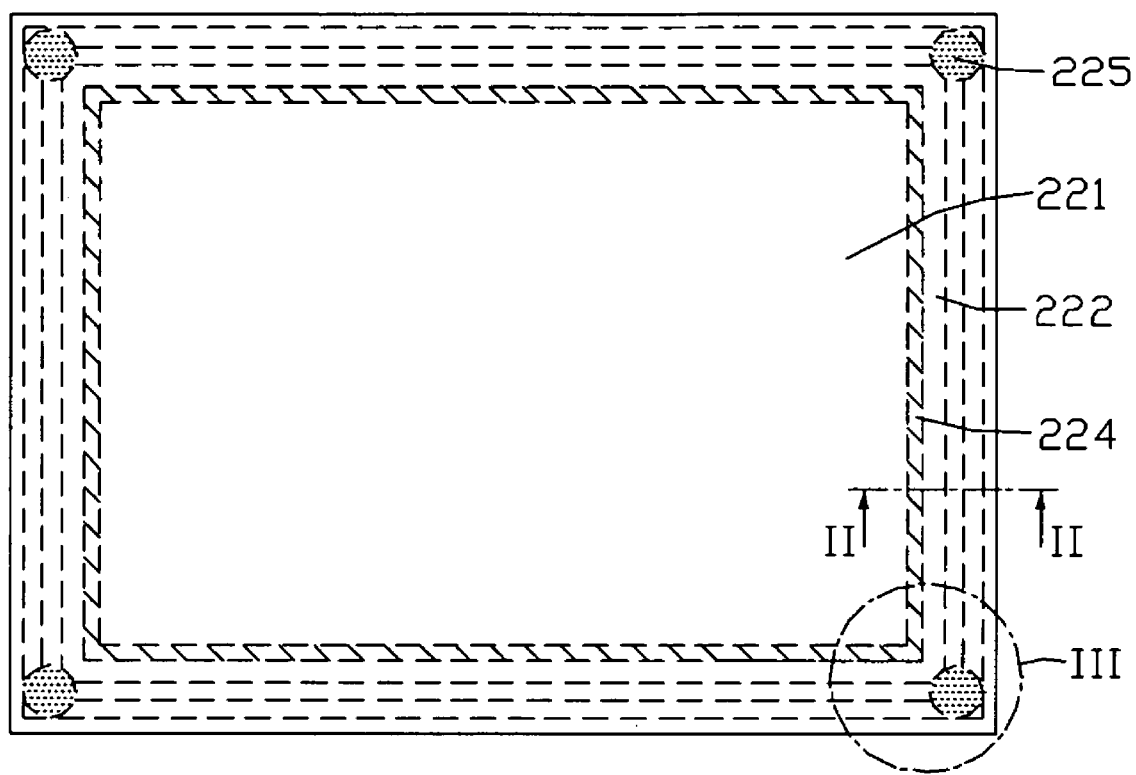
FIG. 1 is a top plan view of a liquid crystal panel according to a first embodiment of the present invention, showing various internal components in phantom.
Figure 2:
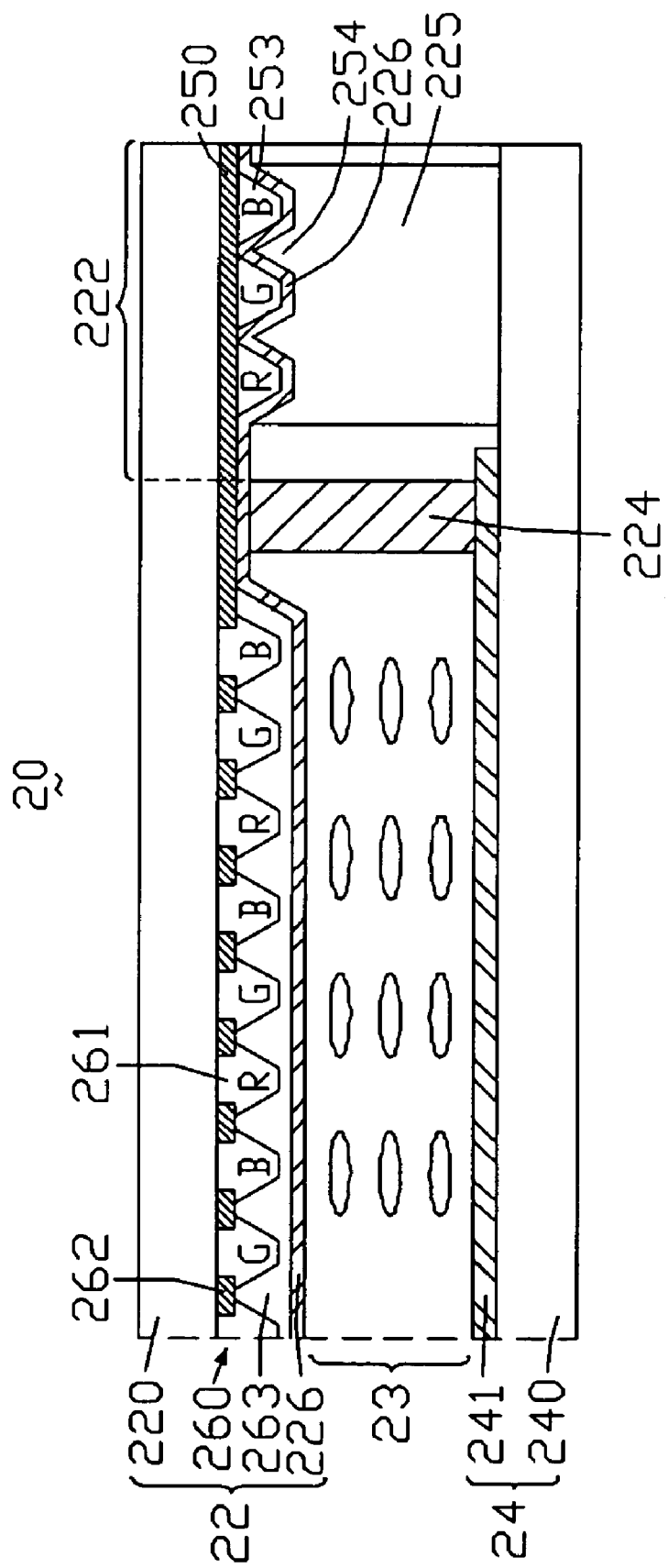
FIG. 2 is an enlarged, side cross-sectional view taken along a line II-II of FIG. 1.

Referring to FIG. 1 and FIG. 2, a liquid crystal panel 20 according to a first embodiment of the present invention includes a first substrate assembly 22, a second substrate assembly 24 facing toward the first substrate assembly 22, a liquid crystal layer 23 sandwiched between the two substrate assemblies 22, 24, a sealant frame 224, and four conductive adhesive blocks 225.

The sealant frame 224 has a four-sided frame shape. The sealant frame 224 is applied at a periphery of the second substrate assembly 24, and is sandwiched between the two substrate assemblies 22, 24. The first substrate assembly 22, the second substrate assembly 24, and the sealant frame 224 cooperatively define a displaying region 221 for accommodating the liquid crystal layer 23. A non-displaying region 222 is defined by the sealant frame 224 and periphery regions of the two substrate assemblies 22, 24. The non-displaying region 222 surrounds the displaying region 221. The four conductive adhesive blocks 225 are located at four corner portions of the non-displaying region 222 of the second substrate assembly 24.

The second substrate assembly 24 includes a second transparent substrate 240 and a TFT driving circuit 241 arranged thereon. The TFT driving circuit 241 is configured to receive various driving signals such as data signals and scanning signals in order to drive the liquid crystal panel 20. The TFT driving circuit 241 includes a plurality of pixel electrodes (not shown) that are arranged in a matrix.

The first substrate assembly 22 includes a first transparent substrate 220, and a color filter layer 260 located on a surface of the first transparent substrate 220 at the displaying region 221. The color filter layer 260 includes a plurality of RGB color filter units 261, a plurality of black matrix units 262, and a coating layer 263. The black matrix units 262 fill up gaps between the RGB color filter units 261. One black matrix unit 262 adjacent to the sealant frame 224 extends to the non-displaying region 222 to cover the first transparent substrate 220, thereby forming a light shielding layer 250. The light shielding layer 250 is configured to absorb light beams at the non-displaying region 222. The coating layer 263 covers the RGB color filter units 261 and the black matrix units 262, and forms a planar surface.

Figure 3:
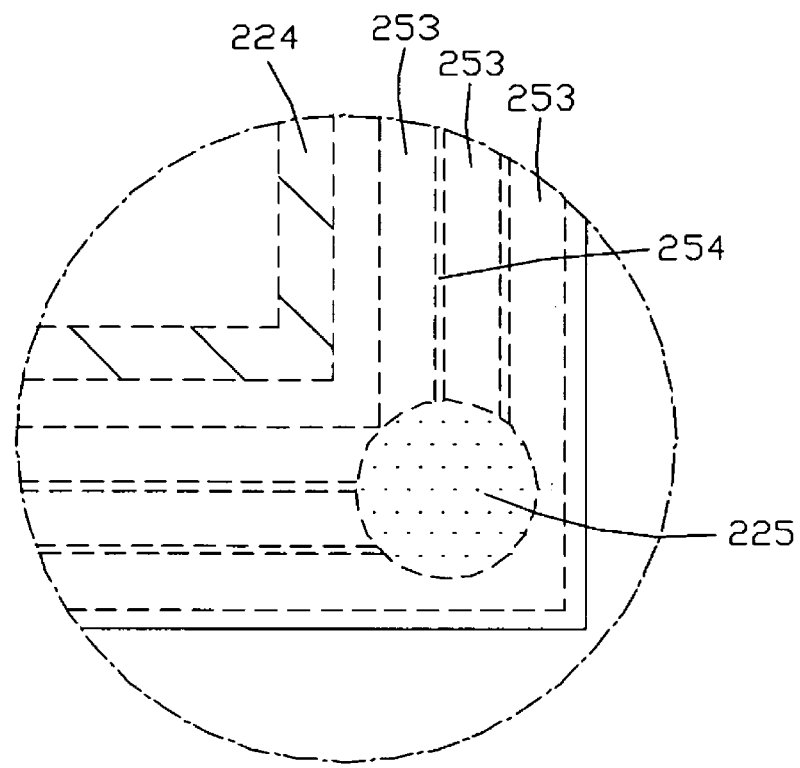
FIG. 3 is an enlarged view of a circled portion III of FIG. 1.

Referring also to FIG. 3, the first substrate assembly 22 further includes a plurality of frame-shaped protrusions 253 at the non-displaying region 222. The protrusions 253 are arranged parallel with each other along directions parallel to the sealant frame 224. In the illustrated embodiment, there are three protrusions 253. The protrusions 253 are made of the same material as that of the RGB color filter units 261, and can be fabricated simultaneously with the RGB color filter units 261. That is, a step of fabricating the protrusions 253 can be merged into a step of fabricating the RGB color filter units 261. Gaps between the adjacent protrusions 253 define a plurality of grooves 254. A common electrode layer 226 covers the coating layer 263, and extends to the non-displaying region 222 to cover the protrusions 253 including the parts of the protrusions 253 defining the grooves 254. A thickness of the common electrode layer 226 on all parts of the protrusions 253 is uniform. Each of the conductive adhesive blocks 225 is embedded in three corresponding adjacent corner portions of the three protrusions 253, and is thereby in contact with the common electrode layer 226 in the non-displaying region 222. In the illustrated embodiment, each conductive adhesive block 225 is disk-shaped (circular). Thus areas of contact interfaces between the conductive adhesive block 225 and the common electrode layer 226 are large. In particular, a total area of the contact interfaces is much larger than a corresponding transverse cross-sectional area of the conductive adhesive block 225. A common voltage signal generated by an external driving circuit (not shown) is transmitted to the common electrode layer 226 via the conductive adhesive blocks 225. The common electrode layer 226 is a transparent conductive layer that can be made of any suitable material, including indium tin oxide (ITO) or indium zinc oxide (IZO).

The common electrode layer 226, the pixel electrodes, and the liquid crystal layer 23 therebetween cooperatively form a plurality of liquid crystal capacitors.

In summary, because the common electrode layer 226 at the non-displaying region 222 covers the protrusions 253 including the surfaces of the protrusions 253 in the grooves 254, a total contact area between each conductive adhesive block 225 and the common electrode layer 226 is expanded. This means an essential resistance of the common electrode layer 226 is reduced. Thus common voltage signal interference and distortion due to an RC circuit induced by the liquid crystal capacitors and the essential resistance of the common electrode layer 226 is reduced or even eliminated. Accordingly, the display quality of the liquid crystal panel 20 can be improved. In addition, because the protrusions 253 are fabricated simultaneously with the RGB color filter units 261, no additional fabricating step is necessary. Therefore, a process of fabricating the liquid crystal panel 20 is relatively simple.

Figure 4:
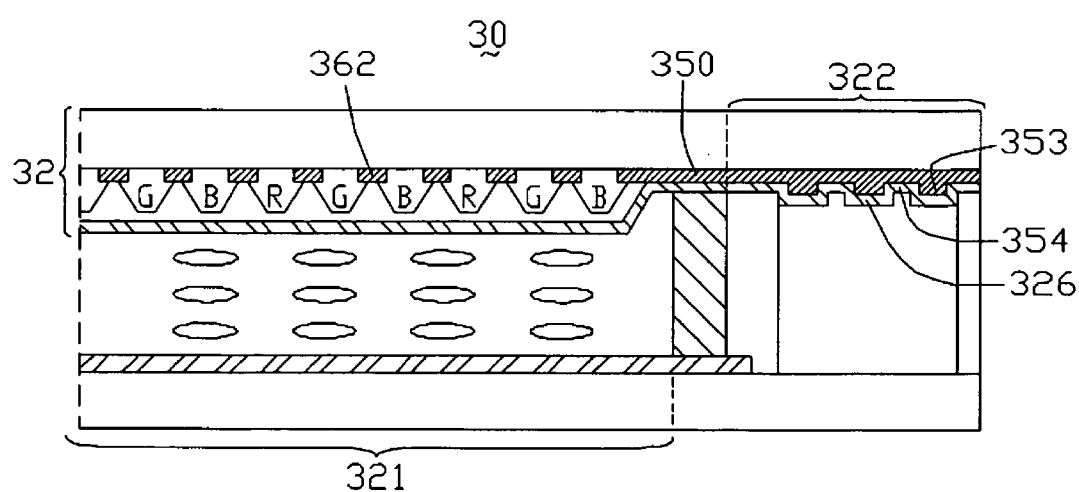
FIG. 4 is a side cross-sectional view of an end portion of a liquid crystal panel according to a second embodiment of the present invention.
Figure 5:
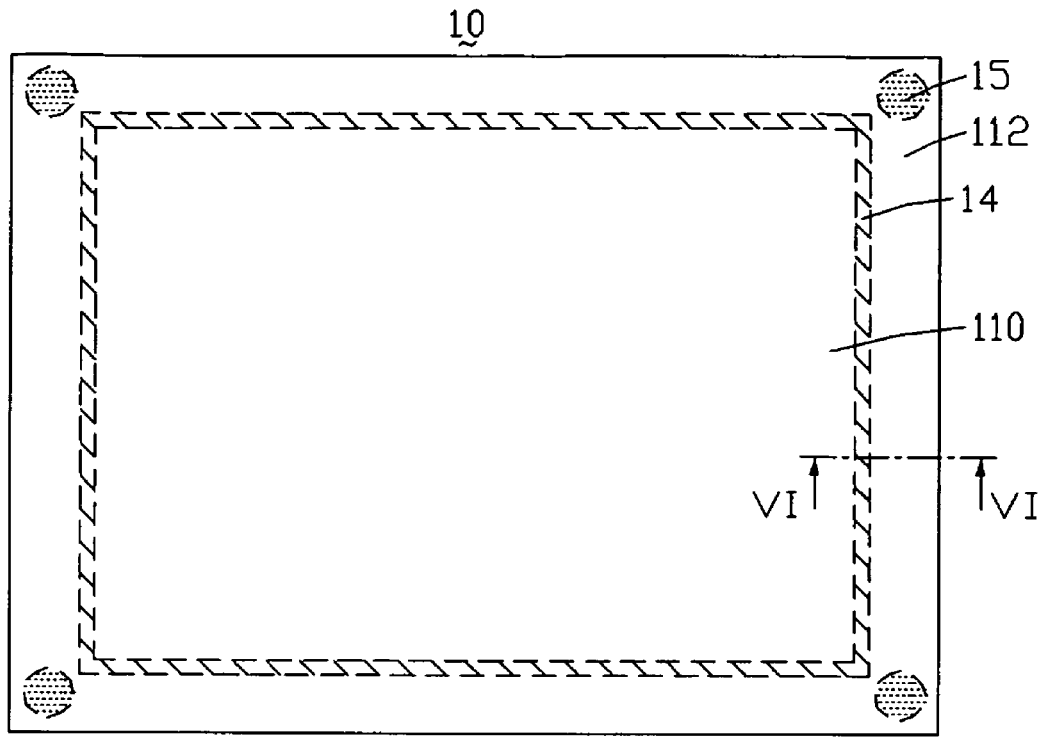
FIG. 5 is a top plan view of a conventional liquid crystal panel, showing internal components in phantom, the liquid crystal panel including a TFT driving circuit (not shown).
Figure 6:
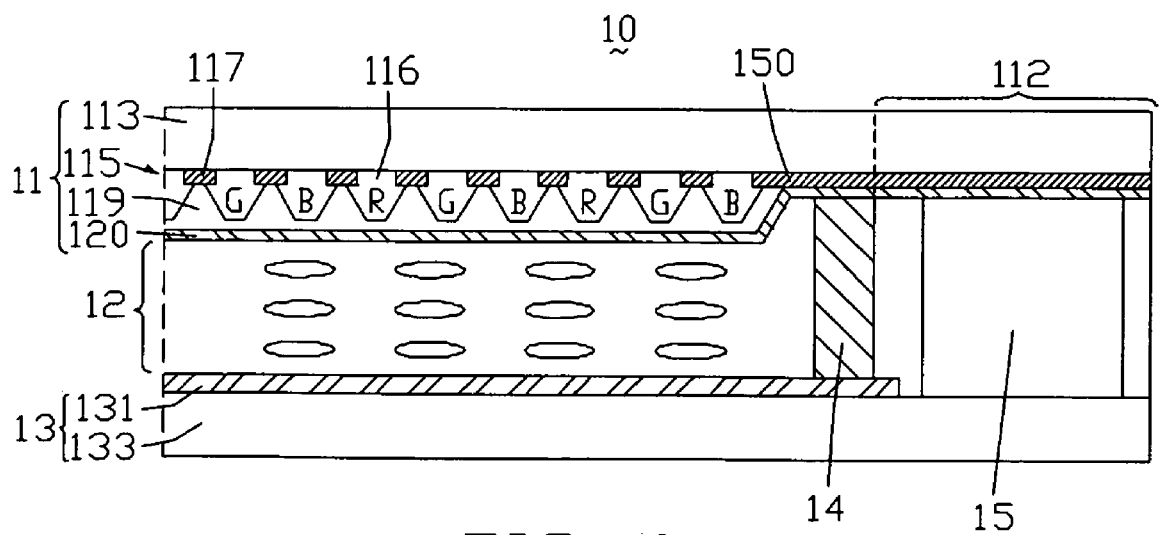
FIG. 6 is an enlarged, side cross-sectional view taken along a line VI-VI of FIG. 5.
Figure 7:
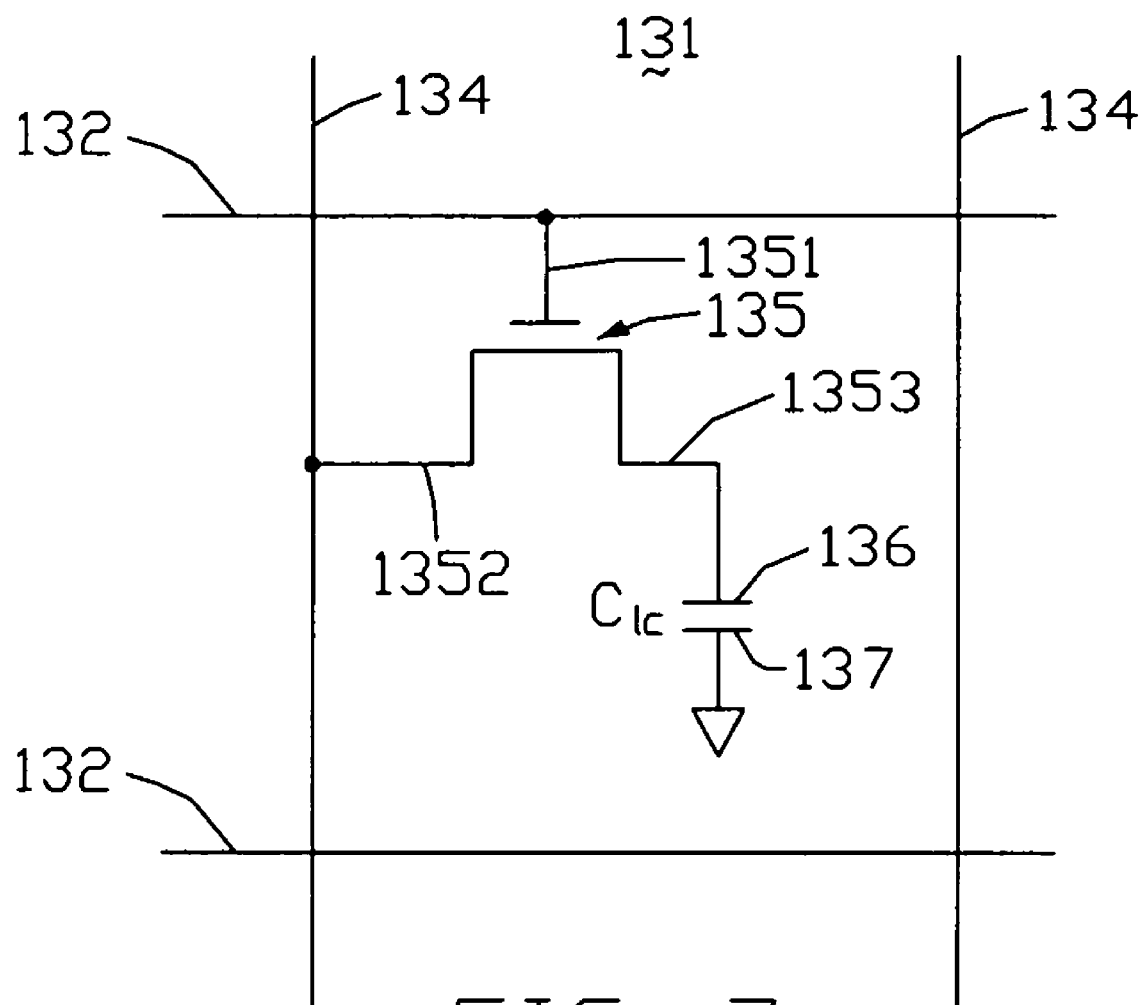
FIG. 7 is an enlarged diagram of part of the TFT driving circuit of the liquid crystal panel of FIG. 5.

Referring to FIG. 4, a side cross-sectional view of an end portion of a liquid crystal panel 30 according to a second embodiment of the present invention is shown. The liquid crystal panel 30 is substantially similar to the liquid crystal panel 20 of the first embodiment. However, a first substrate assembly 32 of the liquid crystal panel 30 at a non-displaying region 322 includes a plurality of protrusions 353, and a plurality of grooves 354 formed by gaps between the protrusions 353. The protrusions 353 extend from a light shielding layer 350 along a direction that is vertical to a main surface of the first substrate assembly 32. Thus the protrusions 353 can be simultaneously fabricated with black matrix units 362 at a displaying region 321 in a same fabricating step. The common electrode layer 326 at the non-displaying region 322 covers the protrusions 353 including surfaces of the protrusions 353 in the grooves 354.

In alternative embodiments, the thickness of the common electrode layer 226, 326 in the grooves 254, 354 can be greater than that of the common electrode layer 226, 326 on other parts of the protrusions 253, 353. In one such embodiment, the thickness of the common electrode layer 226, 326 in the grooves 254, 354 is in a range such that the common electrode layer 226, 326 in the grooves 254, 354 does not protrude below bottom extremities of the common electrode layer 226, 326 on the other parts of the protrusions 253, 353.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. A liquid crystal panel, comprising:
a first substrate defining a non-displaying region;
a second substrate facing toward the first substrate;
a liquid crystal layer sandwiched between the first substrate and the second substrate;
a plurality of conductive adhesive blocks in the non-displaying region; and
a transparent conductive layer provided at a surface of the first substrate and capable of transmitting a common voltage signal to the liquid crystal layer;
wherein the first substrate at the non-displaying region comprises a plurality of protrusions defining a plurality of gaps therebetween, the transparent conductive layer covers the protrusions including parts of the protrusions defining the gaps, the conductive adhesive blocks contact the transparent conductive layer, and a thickness of the transparent conductive layer in the gaps is greater than a thickness of the transparent conductive layer on other portions of the protrusions.

2. The liquid crystal panel of claim 1, wherein the transparent conductive layer in the gaps does not protrude below a bottom extremity of the transparent conductive layer on the other portions of the protrusions.

3. The liquid crystal panel of claim 1, wherein the protrusions are formed at a same layer.

4. The liquid crystal panel of claim 1, wherein the first substrate further defines a displaying region within the non-displaying region, and in the display region, a color filter layer is provided on the first substrate, the color filter layer comprising a plurality of color filter units and a plurality of black matrix units that fill gaps between the color filter units.

5. The liquid crystal panel of claim 4, wherein the protrusions and the color filter units are made of substantially the same material.

6. The liquid crystal panel of claim 5, wherein the color filter units are provided at a same layer in the non-displaying region to form the protrusions.

7. The liquid crystal panel of claim 4, wherein the protrusions and the black matrix units are made of substantially the same material.

8. The liquid crystal panel of claim 1, wherein each of the conductive adhesive blocks corresponds to the plurality of protrusions.

* * * * *